UNITED STATES PATENT OFFICE.

ROBERT DE MASSAY, OF BOCOURT, NEAR ST. QUENTIN, FRANCE.

IMPROVEMENT IN DEFECATING SUGAR.

Specification forming part of Letters Patent No. 7,342, dated May 7, 1850.

*To all whom it may concern:*

Be it known that I, ROBERT DE MASSAY, distiller, of Bocourt, near St. Quentin, (Aisne,) France, have invented an improvement in extracting sugars, which can be crystallized from all matters of which they are formed by the formation of soluble and insoluble saccharates, and for their application for refining, of which the following is a specification.

Mr. Peligot published in 1838, in the Annales de Chemic et de Physique, a very remarkable work on sugars. It was the memorial of this savant which has suggested to me the idea of making a useful application of it, which is the basis of my invention. Among the great numbers of bases with which I have experimented I have chosen those which form insoluble saccharates and insoluble salts with the principal acids. My aim in choosing these bases was, first, in separating immediately the sugar from the juice in the state of an insoluble saccharate or combination of the pure sugars with the bases, and then by drawing off the residue of the liquid, which will take with it all the salts and all foreign matter, avoiding the enormous expense of evaporation, and all other causes which, in the ordinary processes, contribute so much to the formation of sugar which cannot be crystallized; secondly, forming, by the aid of acids, insoluble combinations, which, in liberating the sugar, permit their separation by a second decantation. From these considerations, and among the great number of saccharates, I have decided on the saccharates of barytes and the employment of carbonic acid, reserving to myself, according to my necessity, the use of other bases and other acids. The saccharates of barytes and carbonic acid possess in high degree the properties of which I have just spoken.

*Description of the process for the formation and decomposition of the saccharate of barytes, a process that is applicable to all the bases susceptible of forming insoluble saccharates.*—The juice of the beet-root, of the sugar-cane, and of all other saccharine matter, obtained either by grating and pressure, or by maceration by cylinders, or by any means whatever, is immediately heated, as usual, up to 75° centigrade. Then put into a hectoliter (about twenty-six gallons) of juice six kilograms (about 13.2 pounds) of caustic barytes that has been slaked, or twelve kilograms, four hundred and eighty grams (about twenty-seven pounds) of hydrate of barytes, and, having carefully stirred it, bring it quickly to ebullition. When the barytes is dissolved the defecation is effected and a multitude of little crystals of saccharate of barytes are precipitated. The defecation is done with so much rapidity that it is difficult to distinguish the change; and it may be said, without exaggeration, that the changes are accomplished by enchantment. In boiling the saccharate precipitates rapidly, and at the end of a few minutes the liquid part is decanted, which is very limpid. The saccharate of barytes which has been precipitated, and which is collected afterward, still retains some watery particles, but which can be extracted either by the help of simple straining, with a small quantity of water, and in this is obtained for residue the saccharate of barytes in the state of "magma," which, when a press is used, is formed into and gathered in grayish cakes by compression, which are broken into pieces, and we have then only to separate the sugar from the barytes by the following process:

*Decomposition of the saccharate of barytes by carbonic acid.*—When a press is used the pieces of saccharate are soaked in one and a quarter their weight in water. When merely strained the magma is used, to which is added the quantity of water necessary to wet it down, as in the preceding operation, to one-fourth the weight of the pressed saccharate. It is then decomposed by a current of carbonic acid and washed until a slight excess is seen, at which time carbonate of barytes is formed. The sugar is liberated and held in solution in the liquid. Arrived at this point, it is thrown on the clarifiers. The residue is washed and pressed; The saccharine liquid is evaporated. When it has attained by boiling 30° of the areometer of Baumé it is filtered to separate the carbonate of barytes, which is precipitated during the evaporation. The filtered sirup is again evaporated sufficiently and is thrown into the forms, and a sugar is obtained scarcely colored, and free from uncrystallized sugar. In case you wish to use the mother-water from which it has been precipitated, they will begin by separating the barytes by carbonic acid, and the liquid will afterward be evaporated to a sirupy consistency. This product may be converted into alcohol, or for the extraction of salts—operations which it will be always useful to practice in refining.

In places where it is more advantageous to employ another agent than barytes, the proceeding will be modified according to its character. If a soluble saccharate is employed, it will be treated by double decomposition, so that by pouring out the soluble saccharate immediately after, a soluble salt and an insoluble saccharate are produced.

The above proceeding is applied equally to refining, only with this difference, that instead of operating on the juice the melted sugar is used, calculating for each hundred kilograms, or about two hundred and twenty pounds, of sugar about sixty kilograms, or one hundred and thirty-five pounds, of caustic barytes, or its equivalent in hydrate of barytes, and the mother-waters accruing from the saccharation will contain the incrystallizable sugar pre-existing in the sugar. It must be understood that the quantity of barytes which has been indicated, either for the juice or the refining, varies according to the saccharine richness of the crystallized sugar in both cases. After having pointed out the use of the barytes, I think it necessary to describe the preparation and reproduction of it.

*Carbon and carbonate of barytes.*—In taking the carbonate of barytes, either in its natural or artificial state, it is reduced to a fine powder, as well as the coal. These are intimately mixed. To this mixture is added a paste made of starch or any other pasty matter that will yield by calcination. This paste is divided into little balls, rolled in coal, after which it is put into the pots of which the manufacturers of black—in short, in vases which can be heated to red heat. They obtain in this manner a mixture of caustic barytes and coal. The whole is then thrown into boiling water. Then decant and filter it, and you have a very fine crystallized hydrate of barytes, steam, and carbonate of barytes. We bring to a white heat carbonate of barytes, either natural or artificial, in cylinders through which is passed a current of steam, and a hydrate of barytes is formed, and is disengaged from the carbonic acid mixed with steam, which may be collected and employed to decompose the saccharate of barytes. This hydrate of barytes is dissolved in boiling water and the liquor decanted, which cystallizes in cooling and produces a hydrate from these two preceding processes. An immense advantage is derived of reproducing the barytes with carbon acid, these barytes being derived from the decomposition of the saccharate by carbonic acid, and thus to regenerate the same matter, which serves indefinitely. We must observe, in all the proceedings described above, as well for the production of the carbonic acid and its absorption, you may make use of any suitable means or apparatus known and made use of in the arts.

I claim—

The process, as described, for the immediate separation of the sugar from all foreign matter which injures the purification by the manner above set forth by forming a solid saccharate of baryta, pressing, decomposing, and separating the solid cakes and finishing the process, as set forth, to the almost total suppression of heat necessary to evaporation.

Paris, 13th February, 1850.

ROBERT DE MASSAY.

Witnesses:
  MATHIEN, Aîné,
  JOHN BARTLY.